L. CLOUGH.
SOLID TIRE.
APPLICATION FILED DEC. 4, 1916.
1,268,437.
Patented June 4, 1918.
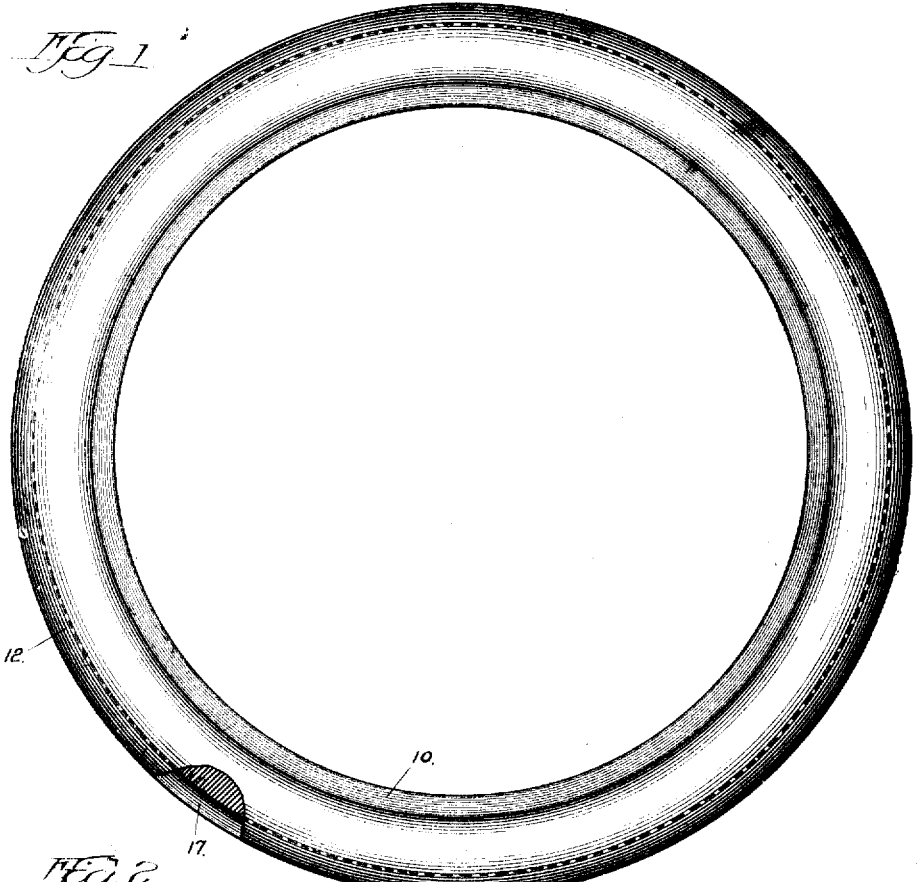
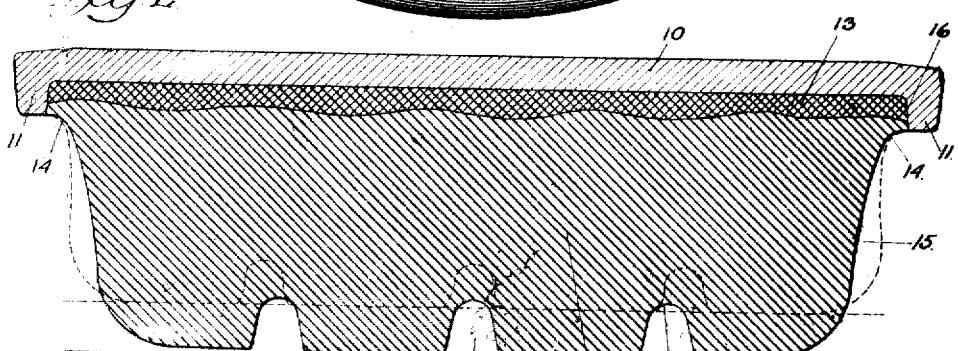
Inventor
LEE CLOUGH.
By C. C. Linthicum
Atty.

UNITED STATES PATENT OFFICE.

LEE CLOUGH, OF AKRON, OHIO, ASSIGNOR TO THE FIRESTONE TIRE & RUBBER COMPANY, OF AKRON, OHIO, A CORPORATION OF OHIO.

SOLID TIRE.

1,268,437.

Specification of Letters Patent.  Patented June 4, 1918.

Application filed December 4, 1916.  Serial No. 134,822.

*To all whom it may concern:*

Be it known that I, LEE CLOUGH, a citizen of the United States, residing at Akron, in the county of Summit and State of Ohio, have invented certain new and useful Improvements in Solid Tires, of which the following is a specification.

In the manufacture of solid tires it has been found impossible heretofore to successfully operate solid tires of large cross section owing to the overheating of large tires due to the working or flow of the rubber which has had to take place at the sides of the tire. There has also been experienced a tendency to skid or side slip unduly. I have sought to obviate both of these difficulties by forming in the face or the tire circumferential channels or grooves into which the rubber may "flow" under pressure. These channels also afford means for ventilating or cooling the tire.

Another object of my invention is to correct a fault heretofore present in single type solid tires, especially those built up on metallic rims, known more generally as "hard base 'res" due to a tendency of the tire to work on the flanges of the metallic rim, resulting in a breaking or cracking of the tire at the edge of the rim. I have sought to obviate this difficul by constructing the tire in such fashion that all of the working or displacement of the rubber under load will be entirely within the flanges of the rim and there will be little or no tendency to separate the tire and rim at this point.

Solid tires have heretofore been produced up to 6 or 7 inches in cross section; but for loads requiring a tire of larger cross section it has been the practice to provide two separate tires or what is known as the dual construction.

This invention is directed to that class of tires known as "giant" tires or tires designed for heavy duty only by which is meant heavy trucks from one and one half tons to three tons and larger. By my construction I am enabled to produce solid tires of the single type up to 14 inches in cross section, or larger, which will not overheat and are practical and more economical than the dual tires. This is the first construction to my knowledge with which it has been possible to successfully operate solid tires of such large cross section.

In the drawings there is shown a solid single type tire constituting my invention, but it is understood that various changes and modifications may be made without sacrificing any of the benefits of this invention:

Figure 1, is a side elevation of a solid single type tire constructed in accordance with this invention.

Fig. 2, is a cross section of the same showing, in dotted lines, the displacement of the rubber under load.

In the drawings like reference numerals refer to like parts, 10 representing the rim which may be of any preferred construction for mounting on a truck or other vehicle wheel, in this instance being shown of a type known as "pressed on," but it is obvious that the rim may be mounted on the wheel in any other way, as, for instance, by the use of wedge rings or other suitable construction. The edges of the rim are provided with flanges 11 which serve to confine the lower edges of the tire. The tire is indicated as a whole by the numeral 12 and may be secured to the rim 10 by a layer of hard rubber 13 interposed between the body of the tire and the rim. This is not an essential feature of the invention for the tire may be held to the rim in any approved manner. The side of the tire begins at the outer edges of the rim flanges and is first brought in a curve 14 of comparatively short radius and substantially tangential to the upper edge of the flange 11, which merges into the gradually tapering sides 15. The curve 14 and the sides 15 are so formed that if a straight line were drawn along the side of the tire and continued down into the base it would pass to the inside of the angle 16 of the base. The purpose of this construction is to confine any movement or working of the tire inside the flanges of the metallic rim and there will be no tendency to split or crack at this point. Before my invention it was the custom to build the solid tire over the upper edges of the flanges and as far as I know I am the first to construct a solid tire built on a flanged metallic rim in which the tire has been inside the flanges of the rim and so shaped that in operating under load there would be no tendency to work or flow over the edge of the flange so as to break or crack.

The sides of the tire are concave in a curve of comparatively long radius, which merges into the tread by a convex curve. The purpose of this concave formation at the sides of the tire is to assure that under load there will be no outward bulging which would result in cracking, due to the tension under which the side of the tire is placed. The absence of sharp corners at the sides of the tread enables the rubber to flow under load without danger of cracking or splitting at this point.

The tread of the tire is crowned slightly as shown in Fig. 2 in order that the load may be applied progressively from the center of the tire toward the sides. In the tread of the tire are formed parallel circumferential grooves 17 and bearing ribs 19, the sides of each groove gradually converging inwardly of the tire and are joined by a curved surface 18. The grooves at the lowest points extend to approximately one fourth of the total depth of the tire and are therefore of sufficient depth to perform their ventilating and non-skidding functions, but not of sufficient depth to prevent the distribution of the load from its point of application throughout the entire body of the tire and also not deep enough to divide the single type tire into a dual type tire. I have shown three of these grooves arranged at equal distances about the tire, but this number and arrangement is not essential and may be varied, if desired.

These circumferential grooves are the principal factors in rendering practicable the operation of large solid tires and the rubber comprising the tire, instead of being compelled to all flow to the side of the tire, as in construction heretofore, may flow from the center of each rib in both directions toward the grooves or the outside of the tire. The position assumed by the tire under load is shown in Fig. 2 by the dotted outline.

It is obvious that various changes and modifications may be made in the construction without departing from the spirit of the invention.

Claim:

A single type tire consisting of a ring of rubber of greater width than depth in cross section and having a broad tread which is substantially flat transversely and provided with a shallow ventilating and non-skid circumferential groove of a depth substantially one-fourth that of the cross section of the tire, that portion of the tire between the back of the groove and the inner periphery of the tire being of such volume and elastic condition as to permit flow of the rubber from any portion of the tread at one side of the groove through the cross section of the tire to the opposite side thereof, whereby a dual tire is obviated and the single type tire is preserved.

LEE CLOUGH.